(12) United States Patent
Luick

(10) Patent No.: US 7,174,469 B2
(45) Date of Patent: Feb. 6, 2007

(54) PROCESSOR POWER AND ENERGY MANAGEMENT

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/675,429

(22) Filed: Sep. 30, 2003

(65) Prior Publication Data

US 2005/0071701 A1    Mar. 31, 2005

(51) Int. Cl.
*G06F 1/00*    (2006.01)
*G06F 1/32*    (2006.01)
*G06F 9/30*    (2006.01)

(52) U.S. Cl. .................. 713/300; 713/320; 712/213
(58) Field of Classification Search ................. 713/300, 713/320, 322, 324, 340; 712/213
See application file for complete search history.

(56) References Cited

U.S. PATENT DOCUMENTS

| | | | | |
|---|---|---|---|---|
| 5,337,415 A | * | 8/1994 | DeLano et al. | 712/213 |
| 5,996,083 A | * | 11/1999 | Gupta et al. | 713/322 |
| 6,775,787 B2 | * | 8/2004 | Greene | 713/340 |
| 2003/0126479 A1 | * | 7/2003 | Burns et al. | 713/300 |

* cited by examiner

*Primary Examiner*—Lynne H. Browne
*Assistant Examiner*—Stefan Stoynov
(74) *Attorney, Agent, or Firm*—Patterson & Sheridan LLP

(57) ABSTRACT

Methods and systems for managing power and energy expenditures in cores of a processor to balance performance with power and energy dissipation are disclosed. Embodiments may include pre-decoder(s) between levels of cache or between main memory and a level of cache to monitor core execution rates by associating power tokens with each instruction. The power tokens include values representing the average power dissipated by the core for instructions and a sum of the power tokens may be compared with a state of management control bits for performance, energy, and power, to determine whether to increase or decrease power dissipation in the core. The power dissipation is varied by, e.g., adjusting the issue rate of instructions, adjusting the execution rate of instructions, turning off unused units within the core, controlling the frequency and voltage of the core, and switching tasks between cores.

43 Claims, 6 Drawing Sheets

PROCESSOR POWER AND ENERGY MANAGEMENT

BACKGROUND OF THE INVENTION

1. Field of the Invention

The present invention generally relates to the field of computer systems. More particularly, the present invention relates to methods and arrangements for managing power and energy in processors of computer systems.

2. Description of the Related Art

The competitive nature of industries has increased reliance on computer systems to perform daily operations, increasing the demand for fast and reliable computer systems with reasonable size and space requirements. The speed, or processing power, of computer systems in the same or smaller packages has led contemporary computer designs toward smaller chips that operate at higher frequencies, inherently increasing power densities within the IC chips. However, the higher frequencies and increased power densities also decrease reliability.

Traditionally, power expenditures by processors are controlled by reducing the voltages and frequencies of processors. For example, in laptops, power may be considered a premium while the laptop is operating strictly off of battery power. Thus, processors for many laptops include various power saving modes of operation that include shutting down parts of the processor and reducing the voltage and frequency for the core(s) while the processing capacity of the processor is not fully utilized.

Modern processors operate at very high frequencies and are projected to reach 20–40 gigahertz (GHz) in the next five to ten years. At such frequencies, small processor cores generate very high power densities even when their voltages and frequencies are reduced. These high power densities subject modern processors to very high failure rates.

The decreased reliability has led many manufacturers toward autonomic computing designs. Autonomic computing refers to computer systems that configure themselves to changing conditions and are self healing in the event of failure. For instance, if one server in a rack of servers fails, the workload for the failed server may be shifted to another server in the rack, allowing operations to continue, albeit, possibly with lower processing capability and, potentially, at a slower processing rate. Nonetheless, fewer failures are catastrophic and less human intervention is required for routine operation.

Autonomic designs may also be incorporated on the IC chip level by incorporating redundant systems of subcomponents for subcomponents that tend to fail such as ports of arrays like register files. Adding redundant systems in a processor core, however, represents a solution for the effect, i.e., high failure rates, rather than a solution for the high power densities. Further, redundant systems both increase the silicon area utilized by the core and slow down the core. Depending upon the number of metallization layers available within a processor, adding redundant components can involve a linear expansion of silicon area, which significantly impacts the costs of manufacturing the processor and the speed with which instructions can be processed by the processor.

Therefore, there is a need for methods and arrangements for dynamically adjusting power densities of processor cores, balancing power and energy expenditures with performance demands, to attenuate or minimize failure rates associated with processor cores.

SUMMARY OF THE INVENTION

Embodiments of the invention generally provide methods and systems for managing power and energy in a processor. One embodiment provides a method for pre-decoding instructions prior to storage of the instruction in a level one cache for a processor core, for managing power dissipation in the processor core. The method generally includes re-encoding an opcode of an instruction to incorporate a power token, the power token comprising a number of bits (typically a byte) to indicate a unit of the processor core to turn off during execution of the instruction; and adjusting the power dissipation in the processor core based upon a state of management control bits associated with the power dissipation, in response to a dynamic power count for the processor core based upon issuance of the instruction.

Another embodiment provides a method for managing power and energy in a processor. The method generally includes monitoring an instruction execution rate for a processor core; creating a dynamic power count representative of power dissipation in the processor core based upon the instruction execution rate; and pre-decoding instructions prior to storage in a level one cache to dynamically adjust power dissipation by the processor core based upon the dynamic power count.

A further embodiment provides a method for managing power and energy in a processor. The method includes encoding instructions with a power token between levels of cache for a processor core, to monitor power dissipation in the processor core; determining a dynamic weighted execution rate based upon the power tokens that are associated with instructions executed by the processor core; and adjusting power dissipation by the processor core based upon the dynamic weighted execution rate.

One embodiment provides a pre-decoder residing between levels of cache for managing power dissipation in a processor core. The pre-decoder may generally include a re-encoder to re-encode an opcode of an instruction to incorporate a power token, the power token comprising a bit to indicate a unit of the processor core to turn off during execution of the instruction; and transform control logic to adjust the power dissipation in the processor core based upon management control bits associated with the power dissipation, in response to a dynamic power count for the processor core.

Another embodiment provides a system for managing power and energy in a processor. The system may generally include a summer to sum power tokens associated with instructions executed by a processor core; an adder coupled with the summer to generate a dynamic weighted execution rate representative of power dissipation in the processor core based upon the sum; a register to maintain a dynamic power count based upon the dynamic execution rate; and a pre-decoder coupled with the register, residing between main memory and a level one cache for the processor core, to associate the power tokens with the instructions and to dynamically adjust power dissipation by the processor core based upon the dynamic power count and a state of management control bits.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
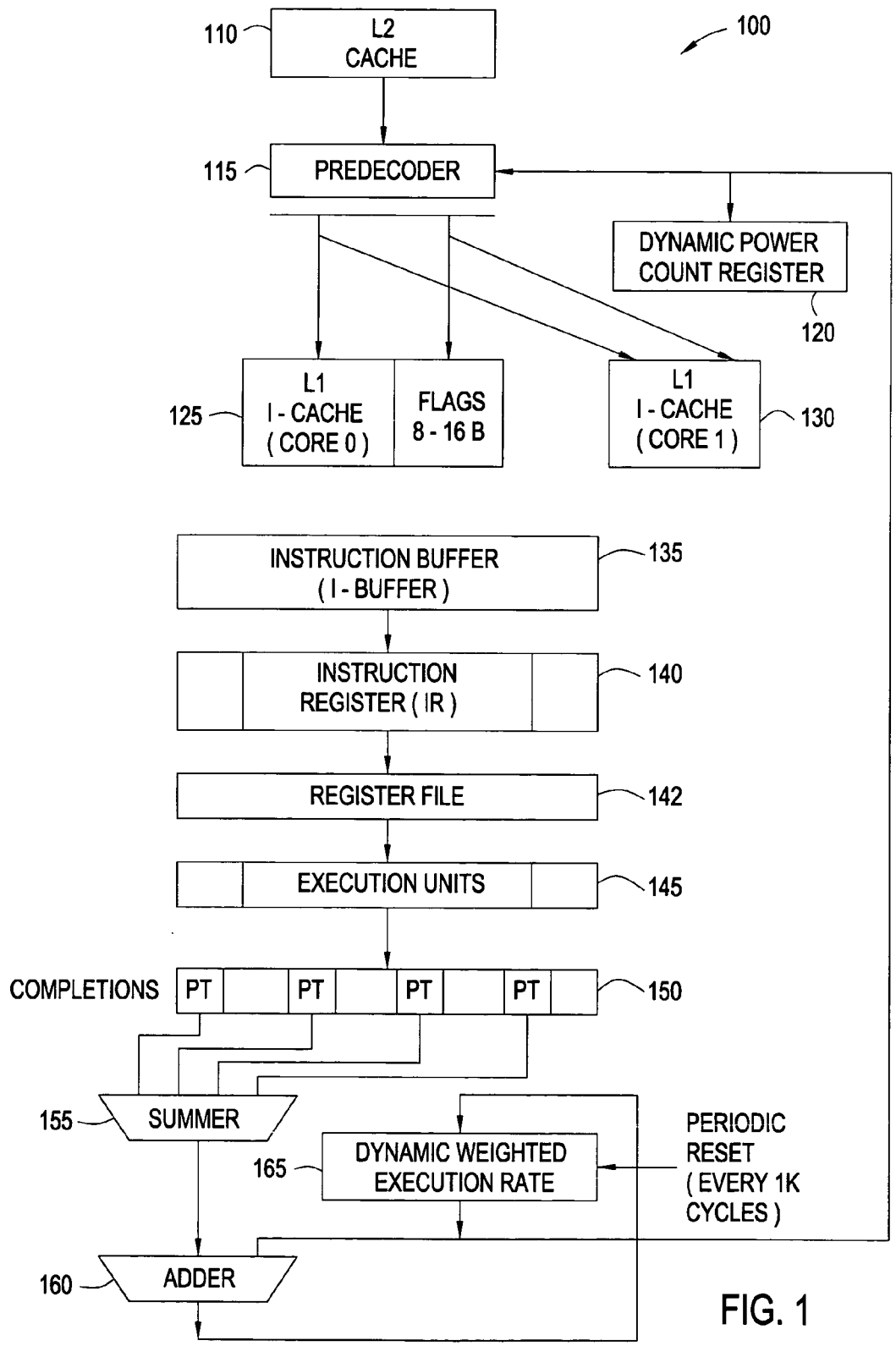
FIG. 1 is an embodiment of system for managing power and energy expenditures associated with a processor core.

The following is a detailed description of embodiments of the invention depicted in the accompanying drawings. The embodiments are examples and are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and systems for managing power and energy expenditures in cores of a processor to balance performance with power and energy dissipation are contemplated. Embodiments may include one or more pre-decoders between levels of cache and/or between main memory and a level of cache. The pre-decoder(s) monitor core execution rates, including cache miss rates, by associating power tokens with instructions to be executed by the core. The power tokens include values representing the average power dissipated by the core for each instruction. In many embodiments, the existing opcodes for instructions can be re-encoded to advantageously include power tokens without increasing the number of bits in the current opcodes. For example, when the opcode is six bits, the instructions can be ranked by average, weighted power dissipation and values can be assigned to identify not only the type of instruction but also the average weighted power dissipation for each instruction.

After power tokens are associated with instructions, power tokens for each valid completion are summed to generate a dynamic power count. Then, the dynamic power count may be compared with a state of management control bits for a performance, energy, and power, to determine whether to increase or decrease power dissipation in the core. In many embodiments, the dynamic power count may also be compared with a threshold that represents a physical limitation of units within the core, to increase reliability of the core and protect the core from damage.

The power, energy, and performance of the core can be varied by, e.g., adjusting the issue rate of instructions to the core, adjusting the execution rate of instructions within the core, turning off units within the core that are not used to execute instructions as the corresponding instructions reach various stages of execution within the core, controlling the frequency and voltage of the core, and switching tasks between cores. Switching tasks between cores is commonly referred to as core hopping.

While specific embodiments will be described below with reference to a multi-pipeline processor, those of skill in the art will realize that embodiments of the present invention may advantageously be implemented in other apparatus having one or more pipelines. Further, embodiments may separate pre-decoder functions and implement the functions in one or more locations between main memory and levels of cache, to manage power and energy dissipation for one or more cores. In some embodiments, opcodes can be re-encoded with useful information other than, or in addition to, the power tokens for use while processing or after execution of the instructions.

Exemplary System Embodiment

Figure 2:
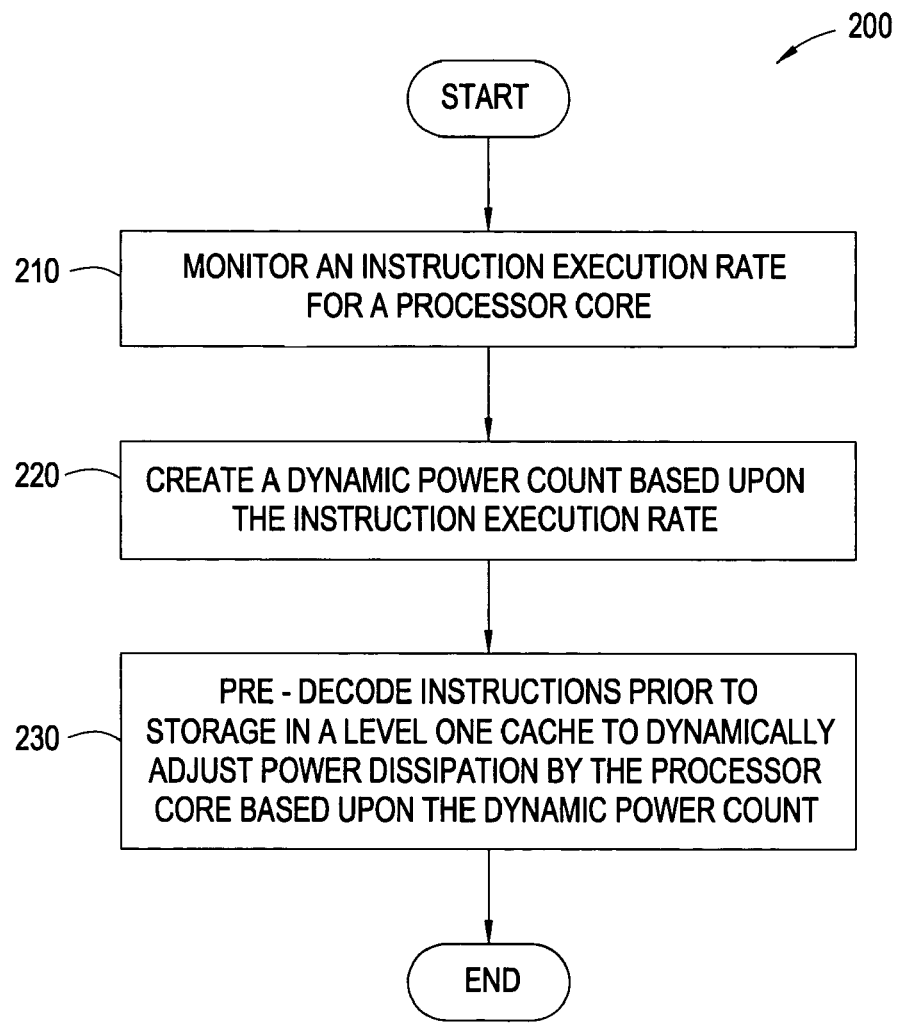
FIG. 2 depicts a flow chart for a method implemented in FIG. 1 for managing power and energy expenditures associated with a processor core.

Turning now to the drawings, FIG. 1 depicts an embodiment of a system 100 for managing power and energy expenditures associated with a processor core and FIG. 2 illustrates a flow chart implemented in system 100. System 100 may represent two cores, core 0 being associated with (L1) instruction cache (I-cache) 125 and core 1 being associated with L1 I-cache 130. System 100 may process instructions from level two (L2) cache 110 via eight instruction pipelines, four pipelines represented by core 0 to process four instructions in parallel and the other four pipelines being represented by core 1. For clarity, the pipelines of core 1 associated with L1 I-cache 130 are not shown but they are similar to the pipelines of core 0 for the purposes of the present invention. System 100 includes L2 cache 110, pre-decoder 115, dynamic power count register 120, L1 I-cache 125, L1 I-cache 130, instruction buffer (I-buffer) 135, register file 142, execution units 145, completions 150, summer 155, adder 160, and dynamic weighted execution rate (DWER) buffer 165. In general, system 100 transfers instructions from L2 cache 110 to L1 I-cache 125 and L1 I-cache 130 via pre-decoder 115.

Processors may include a L1 I-cache 125 and 130 to retain, e.g., copies of repeatedly accessed instructions from main memory, reducing latencies of potentially thousands of cycles for accessing main memory to a few cycles incurred while accessing the cache. However, L1 I-cache is generally small because area used within the processor is expensive.

L2 cache such as L2 cache 110 often resides on the processor module, physically close to the processor, offering significantly reduced latencies with respect to access of main memory. L2 cache 110 may include memory such random access memory (RAM) serving as cache, main memory, or other memory for system 100. L2 cache 110 may be larger than the L1 I-cache 125 and 130 since it is less costly to manufacturer.

Pre-decoder 115 then partially pre-decodes the instructions to dynamically adjust power dissipation of core 0 and core 1 based upon the dynamic power count in dynamic power count register 120 (step 230). More specifically, pre-decoder 115 partially pre-decodes the instructions prior to storing the instructions in either L1 I-cache 125 or L1 I-cache 130, adding a power token (PT) to each instruction as well as control flags to schedule execution of the instructions. The power token may be added to the instructions by re-encoding the instructions based upon average, weighted power dissipation, advantageously incorporating power dissipation information without increasing the number of bits associated with the opcodes and facilitating incorporation of the power tokens in merged cache that include both data and instructions. The power tokens depicted in completions 150 represent the approximate, weighted power dissipations incurred while executing the instructions via core 0. Selecting and incorporating the power tokens in instructions prior to storage in the L1 I-cache, advantageously conserves power by allowing power tokens to be used multiple times, i.e., each time the instructions are retrieved from L1 I-cache for execution.

Pre-decoder 115 decodes instructions sufficiently to identify the type of instructions such as a load, branch, rotate, etc. and re-encodes the instructions to add power tokens. In addition to indicating the power that will be utilized to execute the instructions, the power tokens indicate units within the corresponding core that may be turned off while executing the instruction. For instance, each power token may indicate units, such as execution units 145, that will be used to execute the corresponding instructions so the remainder of the units in the core can advantageously be turned off to conserve power. In some embodiments, pre-decoder 115 includes a look-up table to determine a weighted value representing the power that will be dissipated while executing each instruction as well as an indication of the execution units that will be utilized.

Pre-decoder 115 may also re-schedule parallel execution of the instructions to regulate power and energy in the processor cores. Energy is the total amount of average power times the time interval. Power is a measure of the energy rate. In regard to power, the pre-decoder 115 protects the circuitry for short periods of time such as a millisecond. For example, the time constant of a unit in the middle of the core like an arithmetic logic unit (ALU) may be a few milliseconds so even though the energy over about a second is within tolerable limits, a peak hot spot could develop if the power being dissipated by the ALU remains to high for several milliseconds, potentially preventing the ALU from functioning properly during that period of time since the ALU is too hot. Thus, if the hot spot develops too often, reliability is degraded. In some embodiments, pre-decoder 115 may manage power and energy dissipation for a core as a whole. In other embodiments, the pre-decoder 115 manages power and energy dissipation for individual units within the core, groups of units within the core, or one or more individual cores.

Pre-decoder 115 may incorporate execution flag bits to re-schedule the instructions for execution by indicating the instructions to be executed in parallel and the instructions to stall even though they could be processed in parallel. For instance, when pre-decoder 115 determines that the power being dissipated by the processor is too high, pre-decoder 115 may associate execution flags such as stop bits with instructions to prevent instructions from issuing for one or more cycles or execution flags such as issue bits to issue less than the maximum number of parallel instructions during a cycle. In the present embodiment, for example, since each pipeline can issue four instructions in parallel, pre-decoder 115 may advantageously associate issue bits with instructions in a parallel execution group to issue less than four instructions in parallel, reducing power and energy dissipation in one or more of the cores.

Pre-decoder 115 advantageously resides between levels of cache, or prior to L1 I-cache 125 and 130, to take into account several cycles of propagation delay necessary to transmit the signals to various units of cores 0 and 1 to turn the units on or off. The propagation delay is related to wire delays incurred while propagating the signals. With regard to dynamic logic, for instance, a clock driver typically controls units within the cores and a degate signal should reach the clock driver prior to the clock signal to avoid chopping the clock signal. In some embodiments, degate signals can also reduce power dissipation of static logic by degating the clock driver for the register or register file associated with the static logic. As a result, the register or register file will not change the data at ports coupled with one or more execution units, preventing the static logic of the execution units from changing states.

While incorporating power tokens and flag bits for many of the clockable units within the core may be performed later down the corresponding pipelines, there may be insufficient time to turn off units toward the beginning of the pipelines if the power tokens and flags are incorporated after dispatch from L1 I-cache 135. In particular, instructions such as adds, branches, shifts, rotates, etc., are completed within a few cycles after the instructions are dispatched from I-buffer 135.

In a simple situation, for example, four instructions may be transmitted from L1 I-cache 125 to instruction buffer 135 to execute in parallel. The power tokens of the four instructions are partially decoded when the instructions are stored in I-buffer 135 to determine which units of the instruction pipelines to clock, or turn on for processing the corresponding instructions. At each stage of execution in core 0, the power tokens are decoded sufficiently to determine which units will be used about three cycles ahead of the instructions. Thus, when the instructions are in I-buffer 135, the power tokens may be used to generate degating signals to control the power for units associated with the corresponding pipelines three stages below I-buffer 135 so that when the instruction reaches these units, the appropriate units are powered and the remainder of the units are turned off.

Turning off units is accomplished in different ways depending upon whether the logic is static logic or dynamic logic. For dynamic logic, the unit is turned off by degating the clock driver, which, in effect, blocks the clock signal from being transmitted to the dynamic logic of, e.g., an ALU of execution units 145. On the other hand, static logic burns power each time the logic changes states. A change in data latched to the input of static logic, causes the static logic to burn power. Turning off static logic involves maintaining the same data at the input of the static logic, or preventing the input data to the unit from being changed. Thus, in some embodiments, rather than degating the clock driver, a signal is generated in response to the power token to prevent new data from being latched to the inputs of units having static logic.

Instruction register 140 may decode the instructions and transmit the decoded instructions to register file 142 wherein logic of register file 142 forwards operands of instructions to execution units 145, to execute the four instructions substantially in parallel. Execution units 145 may include execution units such as FXUs, FPUs, ALUs, adders, or the like, to process the instructions of the four pipelines and may also be controlled by the power token. In further embodiments, system 100 may include one or more execution units of the same type and/or different types to facilitate one or more instruction pipelines.

Execution units 145 may then write the resulting data, or completions 155, back to register file 142. In other situations, for example, based upon flags set by pre-decoder 115, less than four instructions may be forwarded to execution unit 145 in parallel, leaving one or more instructions to execute during subsequent cycles.

In many embodiments, a dynamic power count is created based upon the instruction execution rate (step 220) before completions 150 are written back to register file 142. In general, summer 155 sums the power tokens and adder 160 adds the resultant sum to the current contents of DWER buffer 165. More specifically, summer 155 sums the weighted power values of power tokens for valid, executed instructions, taking into account the core execution rate and the cache miss rate. For example, in situations wherein all four pipelines are processing instructions, completions 150 may contain a valid power token for each pipeline and all four power tokens are summed. In other situations, wherein less than four of the pipelines are actually used to execute instructions, less than four of the pipelines may contain valid power tokens so less than four power tokens are summed.

Adder 160 adds the sum of the valid power tokens to DWER buffer 165 and after a certain number of cycles such as 1000 cycles, the sum in DWER buffer 165, or an approximation thereof, is loaded into dynamic power count register 120 to indicate to pre-decoder 115 the current dynamic power count of instructions being executed via one or more of the cores. For example, three valid instructions are executed in parallel by execution units 145. The three instructions are each associated with a power token incorporated into the instructions by pre-decoder 115. Thus, three power tokens are attached to completions 150 for valid, executed instructions. Summer 155 sums the three power tokens and adder 160 adds the sum of the three power tokens to the current sum in DWER buffer 165. The total in DWER buffer 165 is then loaded into dynamic power count register 120 periodically.

Based upon the dynamic power count, pre-decoder 115 is aware of the current power being dissipated by the pipelines associated with both L1 I-cache 125 and L1 I-cache 130. Thus, pre-decoder 115 can adjust the power dissipation of system 100 dynamically based upon the dynamic power count (step 230) by adjusting the flow of instructions through both L1 I-cache 125 and L1 I-cache 130 as well as the units of cores 0 and 1 being powered to process the instructions, control the frequency and voltage of the core dynamically to provide more immediate power and energy changes, and implement core hopping when a task begins to dissipate too much power. The changes may be implemented based upon a balance between performance demands and power and energy dissipation indicated by the state of management control bits for performance, power, and energy, either pre-selected or dynamically determined and provided to pre-decoder 115.

Alternative System Embodiment

Figure 3:
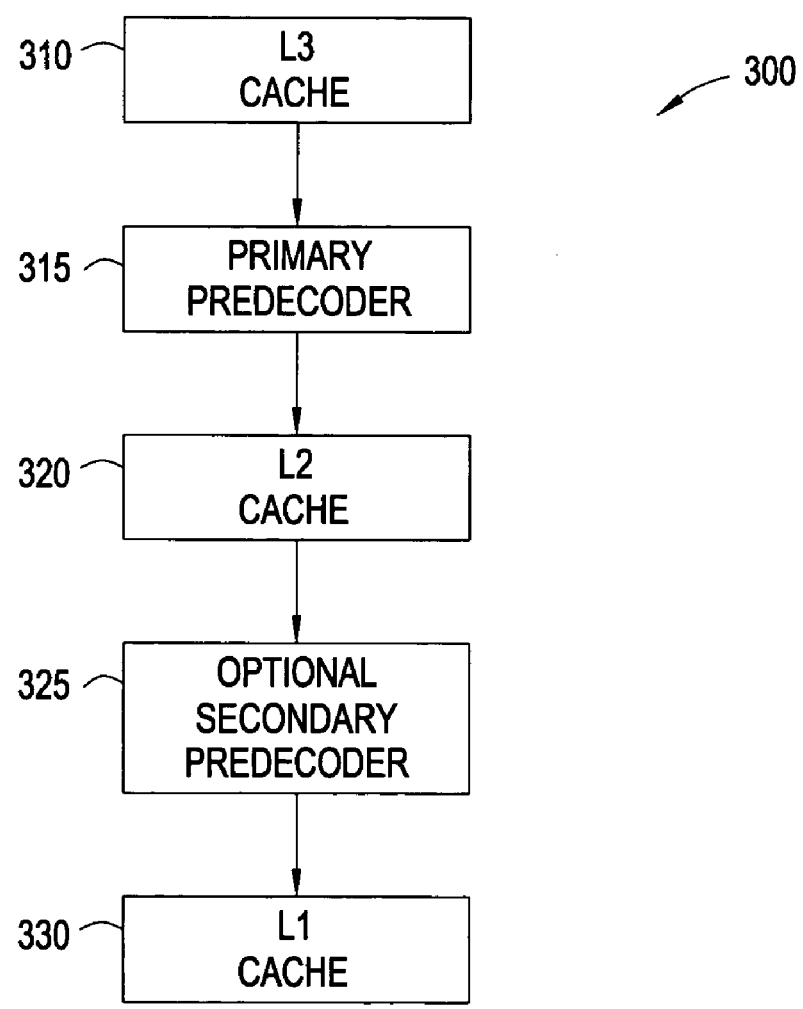
FIG. 3 is an alternative embodiment for the system described in FIG. 1.

Referring now to FIG. 3, there is shown an alternative embodiment, system 300, for system 100 of FIG. 1, to manage power and energy utilization in a core. The difference between system 100 and system 300 is that some of the functions of pre-decoder 115 as well as additional, more complex functions or functions that are associated with greater propagation delays, are implemented by primary pre-decoder 315 while other functions of pre-decoder 115 are implemented by pre-decoder 325. Primary pre-decoder 315 resides between level three (L3) cache 310 and L2 cache 320. L3 cache 310 may be main memory or a level of cache between main memory and L2 cache. L3 cache stores a larger number of instructions than L2 cache for access by a processor core. For example, L3 cache may receive a request for memory at a virtual address, translate the address into a physical address, retrieve the data from the physical address, and respond to the request with the data via primary pre-decoder 315.

Primary pre-decoder 315 pre-decodes the instructions to associate a power token with each instruction and perform other, more complicated computations. Additional power savings are realized by locating these functions between L2 and L3 cache. For instance, an instruction that is pre-decoded between L2 cache and L3 cache may be executed, e.g., 100 times whereas an instruction pre-decoded between L2 and L1 caches may be executed 10 times. In addition, more cycles can be used for computations without delaying instructions in the core. In further embodiments, some pre-decode functions may be moved up to any level of cache although the functions that require a significant number of flag bits may preferably be implemented between L2 and L1 caches.

Pre-decoder 325 is located above the L1 cache in the pipeline. Since L1 cache may primarily contain instructions, this is an advantageous place to generate flag bits and attach them to instructions. Levels of cache above the L1 cache include data, which preferably do not have flag bits attached.

Exemplary Flow Chart

Figure 4:
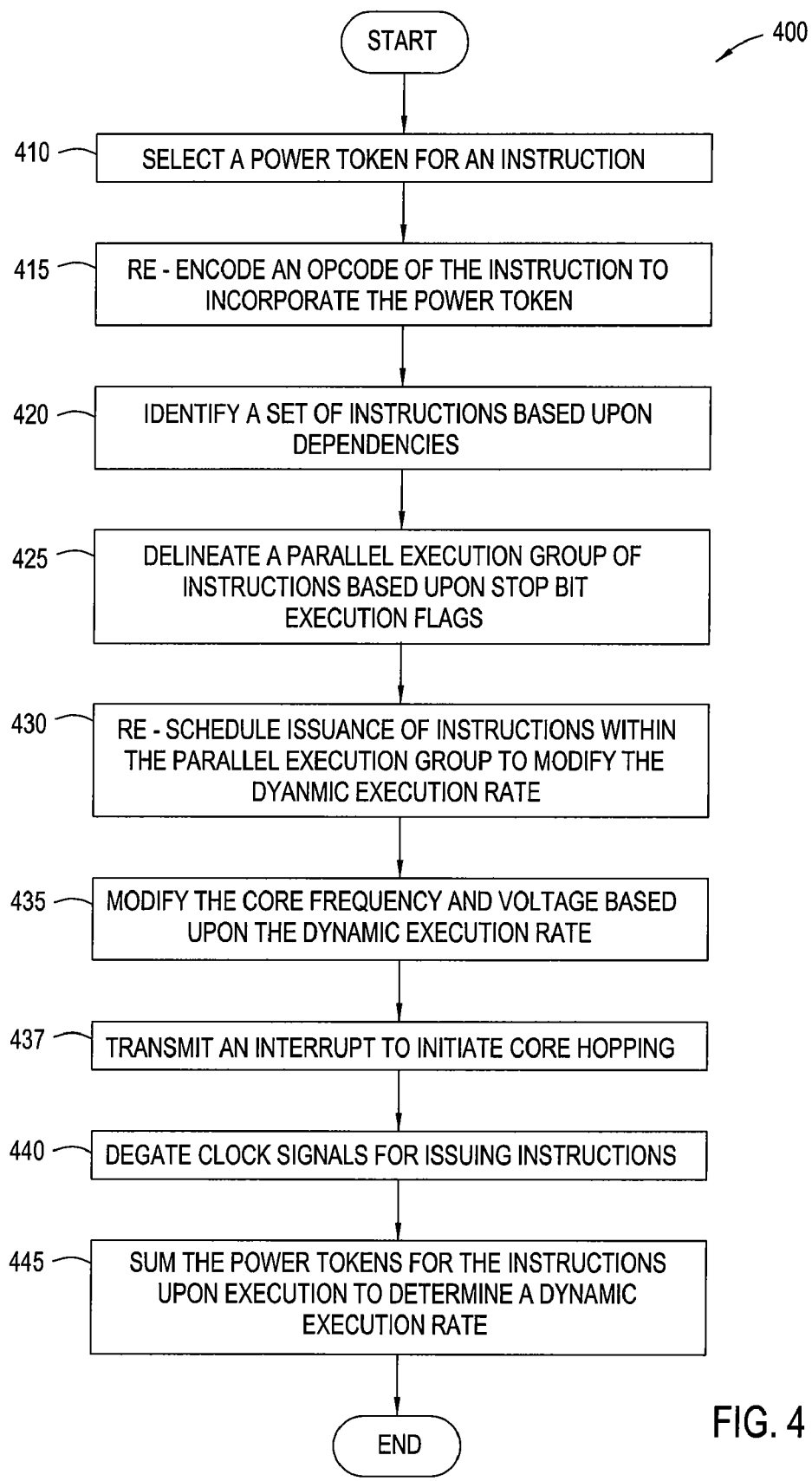
FIG. 4 depicts an example of a flow chart for managing power and energy expenditures associated with a processor core.

FIG. 4 depicts an example of a flow chart 400 for a method to manage power and energy in a core of a processor. The method begins with step 410 by generating a power token for an instruction. Power tokens are attached to each instruction and represent power expenditure associated with each instruction based upon power expenditure of units in the core utilized to execute the instructions. In many embodiments, the power token is looked up in a table of power tokens for instructions. The power tokens may be encoded into the opcode or control bits for the instructions (step 415) and provide instructions to degate clockable units that will not be utilized or to prevent inputs at units of static logic from changing.

Figure 5:
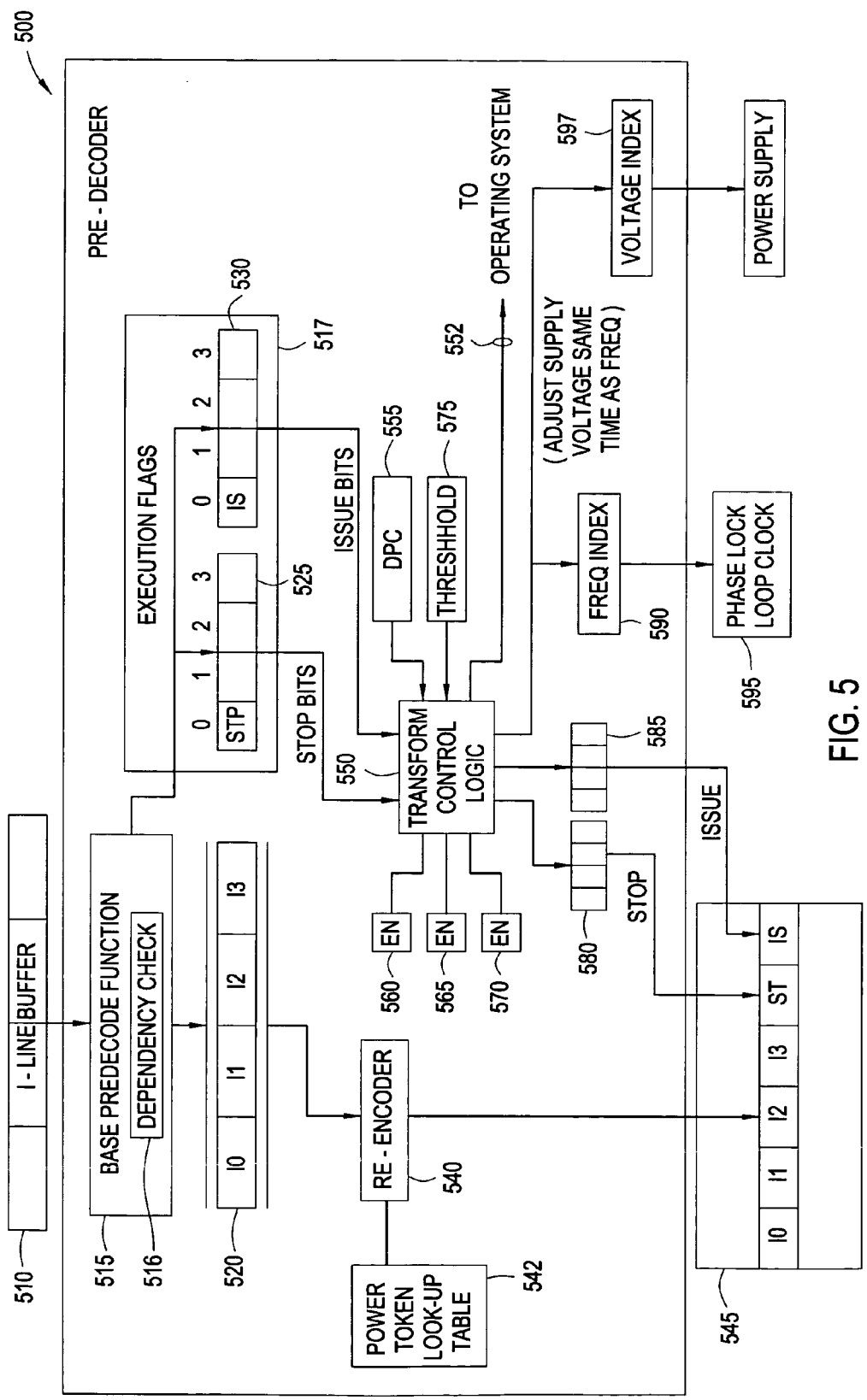
FIG. 5 depicts an embodiment for an apparatus to create a dynamic power count.

For example, FIG. 5 illustrates an example of a pre-decoder 512 for execution of four instructions in parallel. Instructions are received from I-buffer 510 and decoded or partially decoded by base pre-decode function 515. Dependency checker 516 identifies a set of instructions that are independent for purposes of execution in parallel (step 420) and the instructions are grouped into an issue group of up to four instructions 520 by base decoder function 515 to delineate a parallel execution group based upon stop bit execution flags (step 425). The opcode of each instruction group is then re-encoded by re-encoder 540 to incorporate a power token. In the present embodiment, re-encoder 540 couples with power token look-up table 542 to select the power token for each of the instructions.

Power token look-up table 542 may include new opcodes for the instructions that incorporate the power tokens as well as identify the instructions, advantageously incorporating both identification of the instruction and the average weighted power dissipated by the instruction in the same number of bits as current opcode. For instance, instructions may be ranked according to a criteria such as the average power dissipated by the instructions. Then, the instructions may be assigned values to represent the average weighted power dissipation associated with the instructions. Thus, the assigned values may uniquely identify the instruction in addition to representing a weighted value for the average power dissipated. In other embodiments, the new opcodes may incorporate other information by ranking the instructions according to different criteria and, in some embodiments, indicate just the relative ranking of the instructions.

In further embodiments, the new opcodes may increase the number of bits required for the opcodes of instructions.

In addition, the execution flags 517 of the instructions, including stop bits 525 and issue bits 530, are re-encoded by transform control logic 550 to modify the instruction scheduling based upon the state of management control bits: energy 560, power 565, and performance 570 settings. Energy 560, power 565, and performance 570 include management control bits representing a selected or determined optimal performance for the core. In particular, transform control logic 550 receives an indication of the dynamic power expenditure associated with instructions being executed, dynamic power count (DPC) 555. DPC 555 is compared with a threshold 575 to determine whether physical limitations for heat dissipation for the core have been reached or exceeded. Based upon DPC 555, threshold 575, and the state of management control bits, energy 560, power 565, and performance 570, transform control logic 550 may determine whether DPC 555 should be increased or decreased and may increase or decrease performance, power, and energy dissipation by setting execution flags to re-schedule issuance of the parallel execution group (step 430), modifying the core frequency and voltage (step 435), and/or core hopping (step 437).

More specifically, execution flags such as stop bits 580 and issue bits 585 control the number of instructions that will issue in parallel to adjust power, energy, and performance. Stop bits 525 and 580 delineate which instruction is at the end of an issue group. Instructions of the group continue to execute until the stop bit indicates the end of the group. Issue bits 530 and 585 allow instructions to be stalled during issuance. For example, an issue bit associated with an instruction of a parallel execution group can stop that instruction from issuing with the other instructions within the group and allow the instruction to issue during a subsequent cycle. Reducing the number of instructions that issue as a group, in parallel, also reduces power and energy dissipation in the corresponding core.

Transform control logic 550 may re-schedule issuance of instructions in a parallel execution group of instructions (step 430) by generating the stop bits 580 and issue bits 585. Generating the stop 580 and issue 585 bits during pre-decode offers the advantage of utilizing less power since the pre-decoder 515 operates at a lower frequency than units further down the pipeline in the core such as units receiving instructions from L1 cache 545. In addition, generating the stop and issue bits in pre-decoder 515 rather than further down the pipeline can reduce the number of times the bits are generated for the same instruction by, e.g., five or ten times.

Transform control logic 550 may modify the core frequency and voltage (step 435) by adjusting frequency index 590 and voltage Index 597. Frequency index 590 and voltage index 597 facilitate adjustment of the frequency of the clock as well as the voltage supply for the core, respectively, to reduce power and energy dissipation or to increase performance. In particular, the lower the frequency is, the lower the supply voltage can be while maintaining the functionality of the units in the core. The lower frequency reduces the number of pre-charge and discharge cycles for dynamic logic, as well as the number of times the output of static logic is switched. The lower voltage reduces the charge on the pre-charged node in the dynamic logic and the voltage across switching transistors of the static logic, reducing the power dissipation in both.

Further, if the frequency is cut without the voltage then power and energy is being wasted. For example, if DPC 555 is significantly higher than threshold 575, transform control logic 550 can reduce the power dissipation in the core almost immediately by modifying the frequency index 590 and voltage index 597. Whereas inserting stop bits and issue bits affect the issue rate, reducing the power when the core executes the corresponding parallel group of instructions.

On the other hand, increasing the frequency and voltage can increase the performance of the core. The supply voltage must be increased along with the frequency to maintain correct functionality in the units of the core. In particular, increasing the frequency of the core increases the rate of execution of instructions. The increase in the rate of execution must be accompanied by a corresponding increase in the pre-charge on the domino node for dynamic logic and the voltage applied to switching transistors for the static logic, to reduce the time required to switch the output. Otherwise, units within the core may not operate properly at the increased rate of execution.

Phase lock loop clock 595 couples with frequency index 590 to implement a frequency for the core. For instance, frequency index 590 may contain a multiplier for the base frequency of the core. Phase lock loop clock 595 then locks the base clock frequency for the core to a frequency associated with the multiplier.

Transform control logic 550 may also reduce the power is by switching to a different task, often referred to as core hopping or task switching (step 437). The different task may not be operating at a power peak when it is run or may generally operate with a smaller dynamic power count. The tasks may be switched back after the core has had time to cool down. For instance, pre-decoder 515 may issue an interrupt 552 to the operating system indicating that the task is too hot. The operating system may then select a cooler task and assign that task to the corresponding core.

Figure 6A:
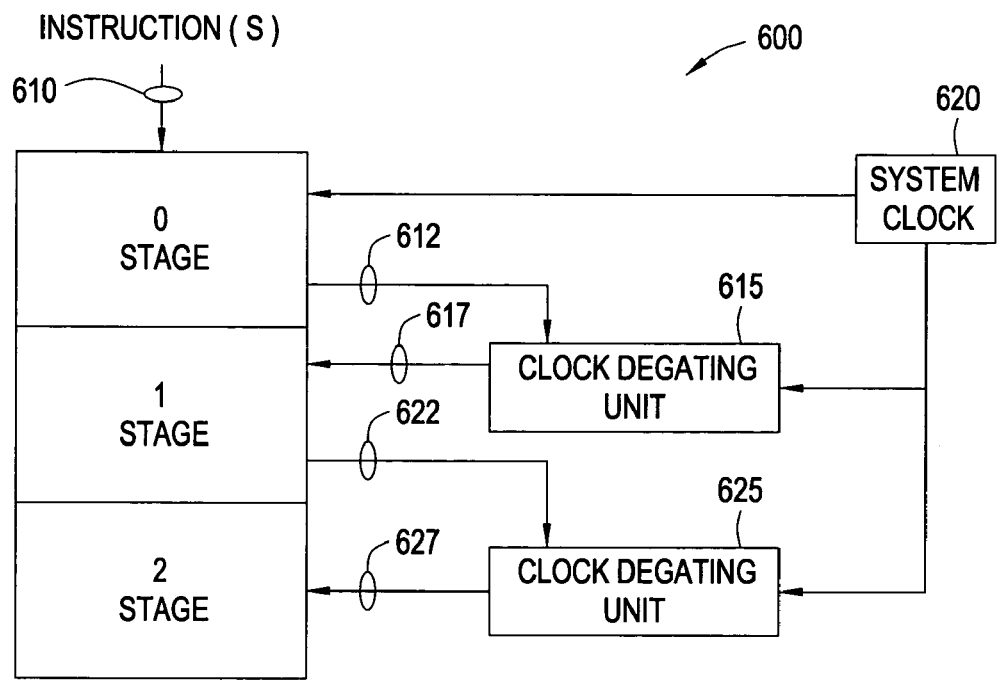
FIGS. 6A–B depict embodiments for an apparatus to turn off units within the core that are not utilized to execute instructions.
Figure 6B:
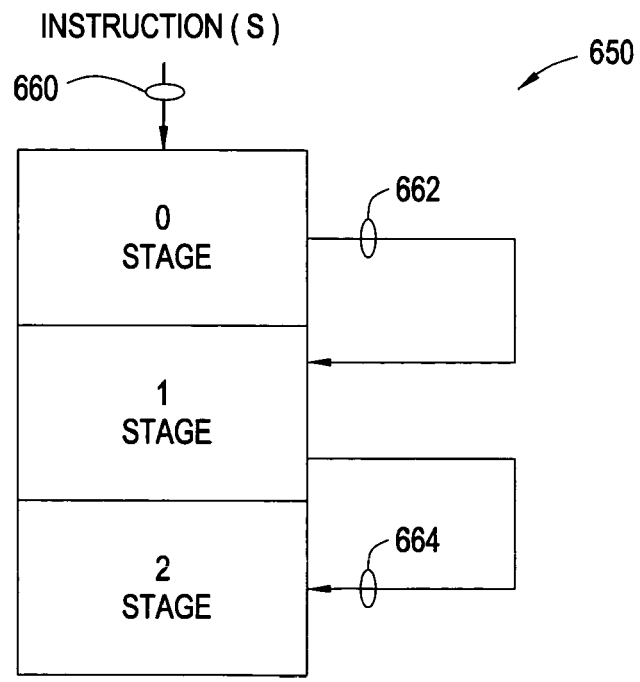

Once the execution flags 517 have been set and the power token(s) are encoded in the opcode of a parallel execution group, the parallel execution group may be forwarded to L1 I-cache 545 for execution. FIGS. 6A and 6B illustrate how the power tokens associated with instructions reduce power dissipation in the core throughout the execution of the instructions by degating clock signals in the core (step 440). The power tokens include bits that describe the units of the core that are used or not used during execution of the corresponding instructions. All the units that are not used during execution of the instructions may be turned off during execution of the instructions to reduce power dissipated by the core.

FIG. 6A depicts an example wherein the core includes dynamic logic. Dynamic logic typically includes a pre-charged node that is charged during part of a clock cycle and discharged during a second part of the clock cycle. Thus, turning off the dynamic logic can be accomplished by preventing the system clock from reaching the dynamic logic circuits. For example, FIG. 6A describes stages zero through two of execution of instructions. For clarity, this illustration assumes a propagation delay of a single stage, or, in other words, clockable units may be turned off one stage in front of the instruction and a single clock-degating unit 615 and 625 is shown for each stage to turn off the corresponding units. In other embodiments, more than one clock degating signal may be generated during stages and more than one clock degating unit may be implemented to turn off corresponding clockable units in the core.

During stage zero, the power token(s) associated with instruction(s) 610 are decoded sufficiently to determine the clockable unit(s) to turn off during stage one for instruction(s) 610. The clock-degating signal 612 indicates the unit(s)

to turn off and is transmitted to clock degating unit 615. Clock degating unit 615 blocks the system clock signal 620 from reaching the clockable units in stage one when instruction(s) 610 reach stage one. Similarly, during stage one, the power token(s) are decoded sufficiently to determine the units to turn off in stage two. Degating signal 622 describes the units to turn off and is transmitted to clock degating unit 625. Clock degating unit 625 then turns off the corresponding units in the pipeline in stage two when instruction(s) 610 reach stage two.

FIG. 6B depicts an example wherein the core includes static logic. Static logic typically dissipates power during switching, i.e. whenever the input(s) to the static logic cause the output to change states. Thus, turning off the static logic can be accomplished by preventing the input(s) to the static logic units from changing. For example, FIG. 6B describes stages zero through two of execution of instruction(s) 660. As with FIG. 6A, for clarity, this illustration also assumes a propagation delay of a single stage. In particular, during stage zero, the power token(s) associated with instruction(s) 660 are decoded sufficiently to determine the unit(s) to turn off during stage one for instruction(s) 660. The signal 662 indicates the unit(s) to turn off and is transmitted to, e.g., a register file in stage one. The register file responds to signal 662 by maintaining the same output on ports coupled with execution units that will not be used to execute instruction 660. Similarly, during stage one, the power token(s) are decoded sufficiently to determine the units to turn off in stage two. Signal 664 describes the units to turn off in one or more of the subsequent stages for instruction(s) 660.

Referring again to FIG. 4, after the instructions are executed and the representation of power dissipation encoded in power tokens of executed instructions are summed (step 445). More specifically, when there are four parallel pipelines in a core, each valid, executed instruction results in a completion associated with a power token. The power tokens for the valid completions are summed to determine the amount of power dissipation that is represented by the executed group of instructions. The sum of those power tokens is then added to a total dynamic weighted power rate (DWER) to monitor the energy dissipated by instructions over a larger period of time. The dynamic power count may be determined from the higher order bits of the DWER each 1024 cycles since the DWER may only be accurate within, e.g., five percent. The dynamic power count is then transmitted to a pre-decoder to indicate the amount of energy that is currently being dissipated by the core.

While the foregoing is directed to embodiments of the present invention, other and further embodiments of the invention may be devised without departing from the basic scope thereof, and the scope thereof is determined by the claims that follow.

What is claimed is:

1. A method for pre-decoding instructions prior to storage of the instruction in a level one cache for a processor core, for managing power dissipation in the processor core, the method comprising:
   re-encoding an opcode of an instruction to incorporate a power token, the power token comprising a bit to indicate a unit of the processor core to turn off during execution of the instruction; and
   adjusting the power dissipation in the processor core based upon a state of management control bits associated with the power dissipation, in response to a dynamic power count for the processor core based upon issuance of the instruction.

2. The method of claim 1, further comprising adjusting the frequency of the processor core and the voltage of the processor core in response to the dynamic power count.

3. The method of claim 1, further comprising adjusting the power dissipation in the processor core based upon a threshold associated with the dynamic power count, the threshold being related to a physical limitation of the processor core.

4. The method of claim 1, further comprising modifying execution flags associated with the instruction, the execution flags to schedule issuance of the instruction with respect to other instructions in a parallel execution group that comprises the instruction.

5. The method of claim 1, wherein re-encoding the opcode comprises selecting the power token from a look-up table, wherein the look-up table comprises the power token and other power tokens for instructions to be executed by the processor core.

6. The method of claim 1, wherein re-encoding the opcode comprises selecting the a new opcode that identifies the instruction and power dissipation associated with the instruction.

7. The method of claim 6, wherein the opcode and the new opcode utilize an equal number of bits.

8. A method, comprising:
   monitoring an instruction execution rate for a processor core;
   creating a dynamic power count representative of power dissipation in the processor core based upon the instruction execution rate; and
   pre-decoding instructions prior to storage in a level one cache to dynamically adjust power dissipation by the processor core based upon the dynamic power count;
   generating a power token for an instruction of the instructions, wherein the power token is associated with a power that the instruction consumes during execution; and
   re-encoding an opcode of the instruction to include the power token.

9. The method of claim 8, wherein the power token is associated with a relative average power that the instruction consumes during execution.

10. The method of claim 9, wherein re-encoding an opcode comprises ranking the instructions based upon power dissipated by each of the instructions and encoding the opcode based upon the ranking.

11. The method of claim 9, wherein monitoring comprises selecting valid completions associated with the instructions.

12. The method of claim 11, wherein creating the dynamic power count comprises summing the power token with other power tokens associated with the valid completions and adding the sum of the power tokens to a total dynamic weighted execution rate.

13. The method of claim 12, wherein creating the dynamic power count comprises periodically loading the total dynamic weighted execution rate into a buffer.

14. The method of claim 8, wherein pre-decoding comprises identifying a set of the instructions, each instruction of the set having a result that is independent of the results of other instructions in the set.

15. The method of claim 8, wherein pre-decoding comprises delineating a group of the instructions for parallel execution based upon stop bit execution flags associated with the instructions.

16. The method of claim 15, wherein pre-decoding comprises selecting instructions from the group to modify the dynamic power count, based upon a state of management control bits, to determine a parallel instruction issue schedule.

17. The method of claim 16, wherein selecting instructions from the group comprises adjusting execution flags associated with the instructions to decrease the dynamic power count.

18. The method of claim 8, wherein pre-decoding comprises incorporating a bit in a power token associated with the instructions to control clock degating of units in the processor core, wherein the units comprise dynamic logic.

19. The method of claim 8, wherein pre-decoding comprises incorporating a bit in a power token associated with the instructions to maintain inputs for units in the processor core, wherein the units comprise static logic.

20. The method of claim 8, wherein pre-decoding comprises modifying the frequency and voltage associated with the processor core based upon the dynamic power count.

21. A method, comprising:
re-encoding an opcode of instructions with a power token between levels of cache for a processor core, to monitor power dissipation in the processor core;
determining a dynamic weighted execution rate based upon the power tokens that are associated with instructions executed by the processor core; and
adjusting power dissipation by the processor core based upon the dynamic weighted execution rate.

22. The method of claim 21, wherein encoding comprises selecting a power token for the instructions from a table of power tokens, wherein the table comprises a pre-determined power token for each of the instructions.

23. The method of claim 21, wherein determining the dynamic weighted execution rate comprises summing the power tokens upon execution of the instructions and adding the sum to the dynamic weighted execution rate.

24. The method of claim 21, wherein adjusting the power dissipation comprises modifying execution flags to adjust an issue rate associated with the instructions.

25. The method of claim 21, wherein adjusting the power dissipation comprises adjusting the frequency and voltage of the processor core.

26. The method of claim 21, wherein adjusting the power dissipation comprises adjusting a number of the instructions associated with a group to execute in parallel via the processor core.

27. The method of claim 21, wherein adjusting the power dissipation comprises transmitting a signal to an operating system to switch tasks associated with the processor core.

28. A pre-decoder residing between levels of cache for managing power dissipation in a processor core, the pre-decoder comprising:
a re-encoder to re-encode an opcode of an instruction to incorporate a power token, the power token comprising a bit to indicate a unit of the processor core to turn off during execution of the instruction; and
transform control logic to adjust the power dissipation in the processor core based upon management control bits associated with an opcode of the power dissipation, in response to a dynamic power count for the processor core.

29. The pre-decoder of claim 28, further comprising a frequency index coupled with the transform control logic to control the frequency of the processor core and a voltage index coupled with the transform control logic to control the voltage of the processor core.

30. The pre-decoder of claim 28, further comprising a threshold buffer having a representation of a physical limitation of the processor core, the physical limitation being related to the dynamic power count, wherein the threshold buffer is coupled with the transform control logic to adjust the power dissipation in the processor core.

31. The pre-decoder of claim 28, further comprising an execution flag register coupled with the transform control logic to modify execution flags associated with the instruction, the execution flags to schedule issuance of the instruction with respect to other instructions in a parallel execution group associated with the instruction.

32. The pre-decoder of claim 28, wherein the re-encoder comprises a power token table, the power token table having the power token and power tokens for other instructions to be executed by the processor core.

33. The pre-decoder of claim 28, wherein the re-encoder is configured to select a new opcode that identifies the instruction and power dissipation associated with the instruction.

34. The pre-decoder of claim 33, wherein the opcode and the new opcode utilize an equal number of bits.

35. A system, comprising:
a summer to sum power tokens associated with instructions executed by a processor core;
an adder coupled with the summer to generate a dynamic weighted execution rate representative of power dissipation in the processor core based upon the sum;
a register to maintain a dynamic power count based upon the dynamic execution rate; and
a pre-decoder coupled with the register, residing between main memory and a level one cache for the processor core, to associate the power tokens with the instructions and to dynamically adjust power dissipation by the processor core based upon the dynamic power count and a state of management control bits.

36. The system of claim 35, wherein the pre-decoder comprises a re-encoder to incorporate the power tokens into opcodes associated with the instructions, wherein each power token indicates a relative average power that the associated instruction of the instructions is to consume during execution by the processor core.

37. The system of claim 36, wherein the power tokens comprise bits to control clock degating of units in the processor core, wherein the units comprise dynamic logic.

38. The system of claim 36, wherein the power tokens comprise bits to prevent inputs for units in the processor core from changing, wherein the units comprise static logic.

39. The system of claim 35, wherein the pre-decoder comprises a base pre-decoder to identify a set of the instructions, each instruction of the set having a result that is independent of the results of other instructions in the set.

40. The system of claim 35, wherein pre-decoding comprises a base pre-decoder to delineate a group of the instructions for parallel execution based upon stop bit execution flags associated with the instructions.

41. The system of claim 40, wherein pre-decoding comprises a base pre-decoder to select instructions from the group to modify the dynamic power count, based upon the state of management control bits, to determine a parallel instruction issue schedule.

42. The system of claim 40, wherein the base pre-decoder is configured to adjust the execution flags to decrease the dynamic power count.

43. The system of claim 35, wherein the pre-decoder is configured to modify a frequency and voltage associated with the processor core.

* * * * *